United States Patent [19]

Newbold

[11] Patent Number: 4,532,622

[45] Date of Patent: Jul. 30, 1985

[54] RECORD DISC, TURNTABLE AND METHOD FOR FIXING SAME

[75] Inventor: Roger A. Newbold, Garden Grove, Calif.

[73] Assignee: Mattel, Inc., Hawthorne, Calif.

[21] Appl. No.: 547,143

[22] Filed: Oct. 31, 1983

[51] Int. Cl.³ .................. G11B 25/04; G11B 23/00
[52] U.S. Cl. .................................. 369/271; 369/270; 403/348
[58] Field of Search ............. 369/270, 271; 403/348, 403/349

[56] References Cited

U.S. PATENT DOCUMENTS

| 650,272 | 5/1900 | Perry | 403/348 |
|---|---|---|---|
| 2,293,212 | 8/1942 | Offen | 274/10 |
| 2,302,503 | 11/1942 | Proctor | 274/39 |
| 3,600,735 | 8/1971 | Jerabek | 403/348 |
| 4,124,215 | 11/1974 | Marason et al. | 274/1 A |
| 4,391,548 | 7/1983 | Malish | 403/348 |

Primary Examiner—Steven L. Stephan
Attorney, Agent, or Firm—Ronald M. Goldman; James G. O'Neill

[57] ABSTRACT

A record disc (10), and method for fixing same to a turntable (24). The record disc has a central opening (18) with a pair of arms (21) forming an interlock (20) and a pair of detents (22) formed integrally on a raised lip (23) extending outwardly from the lower surface of the record disc and surrounding the opening. The opening is placed over the central shaft (26) of the turntable and the record disc is secured to the turntable by the action of the interlock coacting with slots (28) formed at the base of the central shaft and the detents (22) held within a pair of openings (33) formed within a depression (30).

2 Claims, 6 Drawing Figures

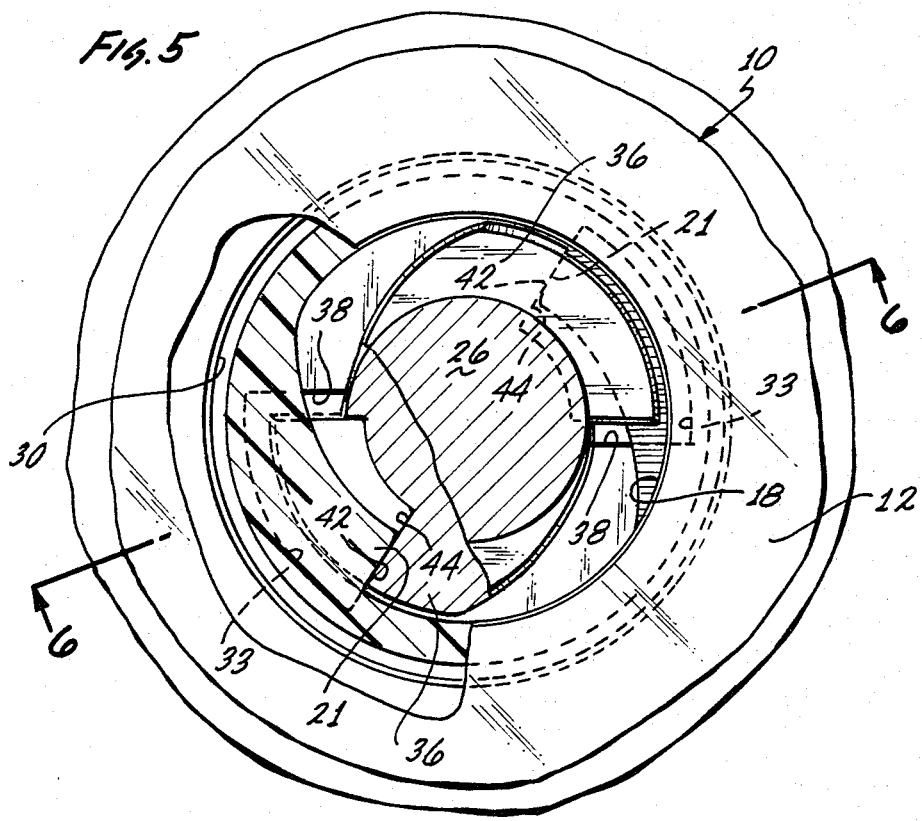
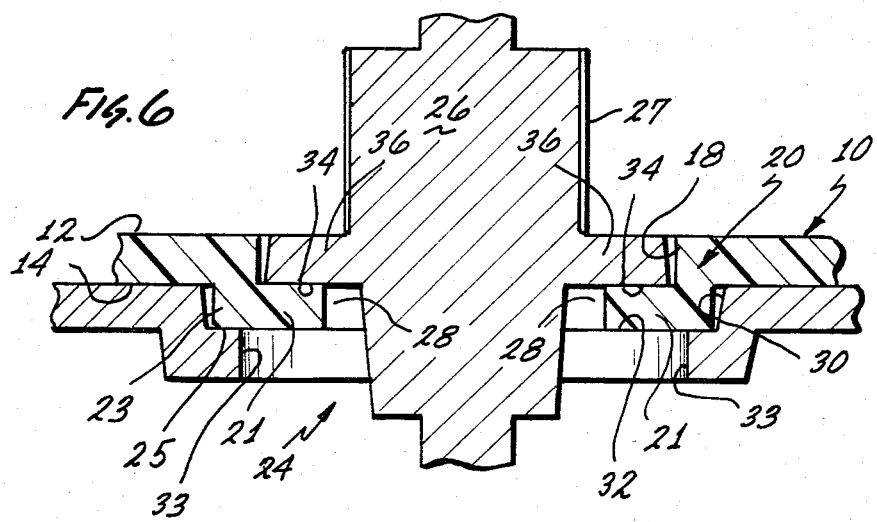

RECORD DISC, TURNTABLE AND METHOD FOR FIXING SAME

DESCRIPTION

1. Technical Field

This invention relates generally to record discs and more particularly to a means and method for attaching a record disc to a turntable.

2. Background Art

U.S. Pat. No. 4,124,215 assigned to Mattel, Inc., the assignee of the present invention, discloses an inertial voice unit having a flywheel carrying a record disc. A constant rotational force is imparted to the flywheel and therefore to the record disc, by means of a sector gear operated by a cocking lever. Numerous other U.S. patents disclose inertial voice units having record discs which are actuated in various ways. In each of these prior art devices, the record disc is attached or fixed to the flywheel or turntable by use of an adhesive disc placed between the turntable and the record.

U.S. Pat. Nos. 2,293,212 and 2,302,503 disclose spindle means for driving records on phonograph turntables.

None of the known prior art discloses a simple, easy to use and inexpensive means for assembling a record disc to a turntable and which securely holds the record to the turntable without the need of adhesive or separate holding means placed between the record disc and the turntable.

DISCLOSURE OF THE INVENTION

The present invention discloses an apparatus and method for fixing a record disc to a turntable. The method comprises the steps of molding a record disc with a central opening therein having interlock and detent means formed within the opening. Diecasting or machining a turntable with a central shaft, to enable the turntable to be rotatably mounted within a housing, together with a plurality of slots and stops formed within the turntable. The record disc and turntable are mounted together by inserting the central opening of the record disc over the central shaft of the turntable with the interlock means in alignment with the slots, and rotating the record disc and turntable with respect to each other until the interlock is held within the slots and the detent means drops into and is held against the stops to securely hold the record disc to the turntable.

BRIEF DESCRIPTION OF THE DRAWINGS

Further objects, features and advantages of the invention will become apparent upon a reading of the following specification when taken in conjunction with the drawings in which like reference numerals refer to like elements in the several views.

FIG. 5 is a view similar to FIG. 4 with a record disc mounted in the secured position on the turntable; and FIG. 6 is a sectional view taken along line 6—6 of FIG. 5.

BEST MODE FOR CARRYING OUT THE INVENTION

Figure 1:
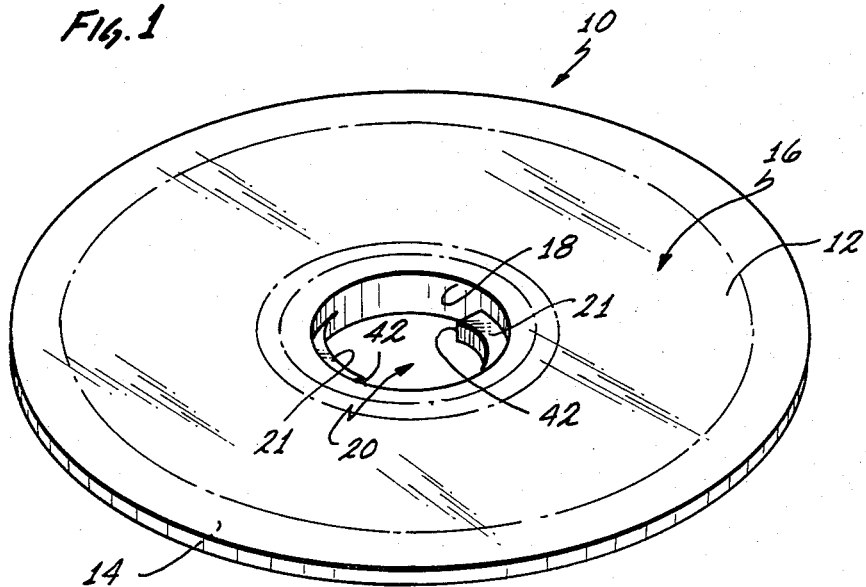
FIG. 1 is a perspective view of the top of a record disc in accordance with the present invention.
Figure 2:
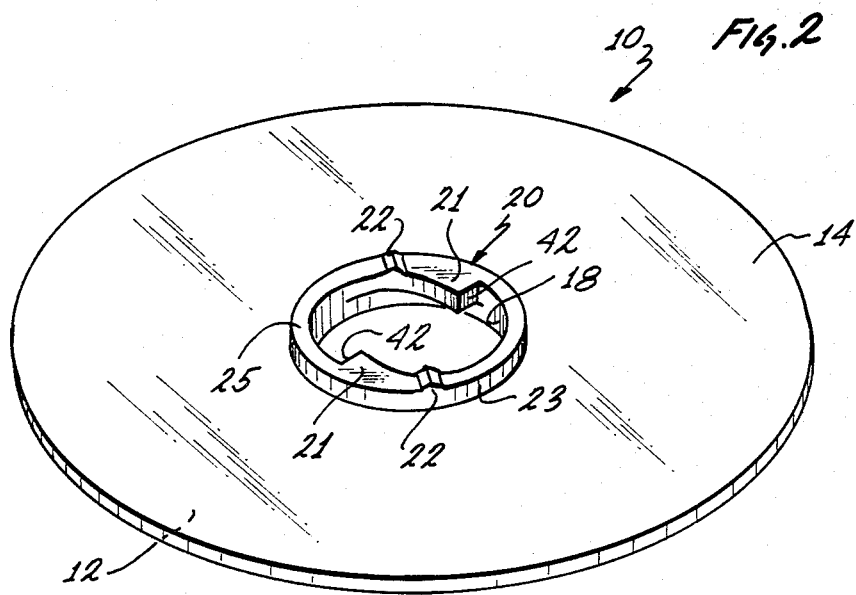
FIG. 2 is a perspective view of the bottom of the record disc shown in FIG. 1 after the record disc has been rotated approximately 90 degrees.
Figure 3:
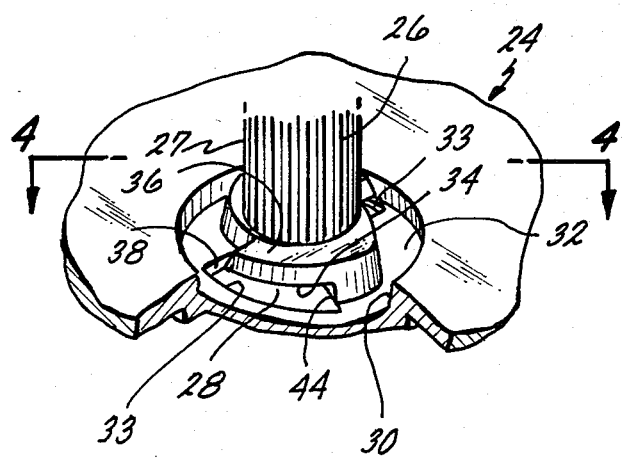
FIG. 3 is a partial enlarged perspective view showing the central portion of a turntable in accordance with the present invention.
Figure 4:
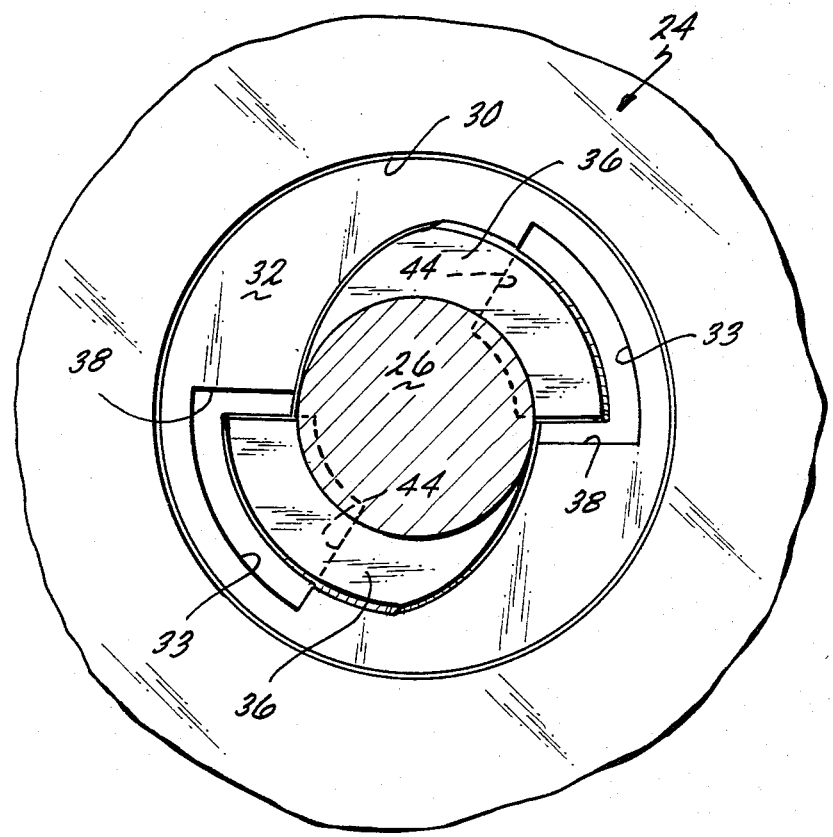
FIG. 4 is a cross-sectional view taken along line 4—4 of FIG. 3.

Referring now to the drawings and more particularly to FIGS. 1 and 2, there shown is a record disc 10 in accordance with the present invention. The record disc includes an upper surface 12 and a lower surface 14. The upper surface includes a number of grooves 16 pre-recorded between inner and outer extremities to match the run-down speed of the record disc. The grooves may be randomly selected and played in a known manner, such as set forth and described in U.S. Pat. No. 4,124,215. Centrally of the record disc there is formed an opening 18 having an interlock means 20, such as a pair of inwardly extending integral arms or ribs 21, formed within the opening. In addition, as shown in exaggerated detail for clarity in FIG. 2, the record disc also includes detent means 22, such as raised knobs formed on a raised lip 23 surrounding the central opening 18 and extending outwardly from the bottom surface 14. The raised lip ends in a flat outer surface 25. The record disc is preferrably molded, but may be machined, in one piece from a plastic material such as nylon zytel 101, celanese 1000 or recompound black general purpose adell nylon.

The record disc 10 of FIGS. 1 and 2 may be secured to a turntable 24, such as shown in FIGS. 3-6. This turntable may be made in any desired manner, such as by diecasting or machining and may include an integral flywheel, such as the type set forth in U.S. Pat. No. 4,124,215. A central portion which may include a shaft 26 is formed integrally with the turntable, or fixedly attached thereto in a known manner. A pinion gear or the like 27 may be fixed to or formed around the shaft 26 to enable the turntable to be rotated, in the manner set forth in U.S. Pat. No. 4,124,215. A plurality of radial slots or grooves 28 are formed adjacent the lower portion of shaft 26 and pinion gear 27, centrally of the turntable 24 for holding the extending fingers 21 of interlock means 20 of the record disc 10 securely in place. The grooves or slots 28 are formed in a centrally depressed area 30 of a pre-determined depth. The interlock means 20 of record disc 10 may be inserted in the depression 30 until bottom surface 25 contacts bottom 32 of the depression.

The slots 28 include tops 34, and are preferrably formed in outwardly extending wing shaped portions 36 fixed to or integrally formed with the central shaft 26 or the pinion gear 27. The bottom 32 of the central depression 30 is provided with a pair of openings or stops 33 on opposite sides of the depression, and generally aligned with the outwardly extending portions 36. As shown more clearly in FIGS. 5 and 6, when the record disc 10 is inserted over shaft 26 and rests on turntable 24, the raised lip 23 seats in centrally depressed area 30. The record disc may then be rotated in the counterclockwise direction (when looking at the drawings), that is, in the direction opposite that which the turntable rotates when playing.

The record disc is turned until end walls 42 of the arms 21 abut end walls 44 within slots 28. In this position, detent means 22 will drop into or enter openings 33 and be held in position against end walls 38 thereby securely holding the record disc to the turntable.

In summary, after being formed and grooves 16 added, a record disc 10 is mounted to a turntable 24 in the following manner. Central opening 18 is aligned with central shaft 26 and moved downwardly until the lower surface 25 of the raised lip 23 contacts the bottom surface 32 of depression 30. Extending arms 21 of interlock means 20 are aligned with the slots 28. The record disc 10 and the turntable 24 are then rotated with respect to each other to allow the arms 21 to enter into the slots 28 under the top surface 34, and continue their travel until end walls 42 of the arms 21 abut end walls 44 in slots 28. In this position, the detent means 22 move downwardly into the openings 33 and are held in position against end walls 38 of the openings, to prevent turning and therefore removal of the record disc from the turntable. In addition, the thickness of the arms 21 is such that they abut the top surfaces 34 of the slots 28, to prevent upward movement of the record disc with respect to the turntable. If required the record disc may be removed from the turntable upon destruction of the detent means, destruction of the record disc itself, or simultaneously pressing both of the detent means 22 up out of the openings 33, and rotating the record disc 10 in the clockwise direction.

While a particular embodiment of the record disc and turntable of the present invention has been described in considerable detail herein, it is to be understood that this description is merely illustrative of the invention and that no limitations are intended other than are found in the attached claims.

I claim:

1. The combination of a record disc and a turntable permanently fixed together comprising:
   a record disc having a preselected number of grooves prerecorded thereon, and a central opening formed in the record disc;
   interlock and detent means formed on said record disc adjacent said opening;
   a central shaft fixed to said turntable for rotatably mounting said turntable in a housing;
   a plurality of slots and a holding means formed in said turntable adjacent to the lower portion of said shaft;
   said record disc being permanently, fixedly mounted to said turntable by insertion of the central opening of said record disc over said central shaft until said interlock means on said record disc enters said plurality of slots in said turntable; and rotating said record disc with respect to said turntable until said interlock means is captured within said slots by action of said detent means coacting with said holding means to thereby permanently hold said record disc to said turntable.

2. The combination of claim 1 wherein said holding means in said turntable comprises a pair of openings formed in said turntable aligned with a pair of outwardly extending wing portions formed about said central shaft, said plurality of slots being formed between said openings and said wing portions, and said detent means on said record disc being comprised of a pair of raised knobs formed on a bottom surface of a raised lip formed about said opening in said record disc on a lower surface of said record disc.

* * * * *